United States Patent [19]

Kiuchi et al.

[11] Patent Number: 4,479,707
[45] Date of Patent: Oct. 30, 1984

[54] EXPOSURE TIME REPRODUCING DEVICE

[75] Inventors: Masayoshi Kiuchi, Tokyo; Nobuaki Sakurada, Kanagawa, both of Japan

[73] Assignee: Canon Kabushiki Kaisha, Tokyo, Japan

[21] Appl. No.: 410,883

[22] Filed: Aug. 24, 1982

[30] Foreign Application Priority Data

Aug. 31, 1981 [JP] Japan .................. 56-137159

[51] Int. Cl.³ ............................................. G03B 7/093
[52] U.S. Cl. .................................... 354/426; 354/427; 354/458
[58] Field of Search .................. 354/23 D, 24, 38, 50, 354/51, 60 A, 258, 426, 427, 458

[56] References Cited

U.S. PATENT DOCUMENTS 4,213,688 7/1980 Mikajiri ........................ 354/50 X
4,349,263 9/1982 Uchidoi et al. .................. 354/50 X Primary Examiner—William B. Perkey
Attorney, Agent, or Firm—Toren, McGeady and Stanger

[57] ABSTRACT

In the disclosed exposure time reproducing device, a digitally suppressed exposure time datum is expanded by shifting the decimal part of the datum according to the contents of its integral part. The expanded datum thus obtained is read out by means of pulses of a predetermined frequency.

3 Claims, 4 Drawing Figures

FIG. 2

| TV | TV' (HEX) | T_SET NUMBER OF PULSES | CLOCK (KHz) | TV | TV' (HEX) | T_SET NUMBER OF PULSES | CLOCK (KHz) |
|---|---|---|---|---|---|---|---|
| 1−0 | 08 | 0 | 32.768 | −3 | 48 | 1 | 32.768 → 1.024 → |
| 10 7/8 | 09 | 2 | | −2 | 50 | 0 | |
| 10 6/8 | 0A | 4 | | −1 | 58 | 0 | |
| 10 5/8 | 0B | 6 | | 0 | 60 | 0 | |
| 10 4/8 | 0C | 8 | | 1 | 68 | 0 | |
| 10 3/8 | 0D | A | | 2 | 70 | 0 | |
| 10 2/8 | 0E | C | | 3 | 78 | 0 | |
| 10 1/8 | 0F | E | | 4 | 80 | 0 | |
| 10 | 10 | 20 | | 5 | 88 | 0 | |
| 9 7/8 | 11 | 24 | | | | | |
| 9 6/8 | 12 | 28 | | | | | |
| 9 5/8 | 13 | 2C | | | | | |
| 9 4/8 | 14 | 30 | | | | | |
| 9 3/8 | 15 | 34 | | | | | |
| 9 2/8 | 16 | 38 | | | | | |
| 9 1/8 | 17 | 3C | | | | | |
| 9 | 18 | 40 | | | | | |
| 8 7/8 | 19 | 48 | | | | | |
| 8 6/8 | 1A | 50 | | | | | |
| 8 5/8 | 1B | 58 | | | | | |
| 8 | 20 | 80 | | | | | |
| 7 | 28 | 100 | | | | | |
| 6 | 30 | 200 | | | | | |
| 5 | 38 | 400 | | | | | |
| 4 | 40 | 800 | | | | | |

EXPOSURE TIME REPRODUCING DEVICE

BACKGROUND OF THE INVENTION

1. Field of the Invention

This invention relates to an exposure time reproducing device which digitally reproduces an exposure time and more particularly to a digital exposure time reproducing device which reproduces a digital datum relative to a logarithmically suppressed exposure time into an actual exposure time.

2. Description of the Prior Art

In the conventionally known exposure reproducing device of the above stated kind, one of several read-out pulse trains is selected according to the information in the integral part of an exposure time datum (information on an exposure time value nEV, wherein n represents an integer); the number of pulses of the selected pulse train is counted concurrently with opening of a shutter; and the shutter is arranged to be closed when the counted value thus obtained coincides with a value corresponding to information in the decimal part of an exposure time datum (information on an exposure time of 1/n EV, wherein n represents an integer). However, such an exposure time reproducing device necessitates as many read-out pulses as the number of stepped values of exposure time to be controlled, i.e. the number of controlled exposure time values EV. Where the exposure time to be controlled ranges from 1/2000 sec to 1 sec, the number of the exposure time values, for example, is 11. Therefore, a circuit arrangement for producing the read-out pulse trains becomes more complex as the exposure time value reproducing range becomes wider. Because of this problem, the conventional exposure time reproducing devices have not been suited for high-grade cameras requiring exposure control over a wide range.

Another shortcoming of the conventional devices of this kind has resided in that the functions of the systems as a whole become inflexible with one circuit arranged for each function independently of another. This inflexibility has been defying all attempts to make additions and/or modifications of the device.

To solve the problems of these conventional devices, a device was proposed by Japanese laid-open patent application No. 55-105232, published Aug. 12, 1980. The proposed device uses a micro-computer. In accordance with this prior art device, a logarithmically suppressed digital exposure time datum is expanded by shifting the datum of the decimal part thereof according to the contents of the integral part thereof. Then, the expanded datum is read out by means of pulses of a predetermined frequency.

However, this prior art device is hardly practicable for lack of consideration of exposure errors that result, in a camera using a slit shutter, from the overlapping of the leading and trailing curtains of the shutter and a response delay time of a magnet provided for the purpose of controlling the trailing curtain.

SUMMARY OF THE INVENTION

It is an object of this invention to provide an exposure time reproducing device which is capable of eliminating the shortcomings of the prior art devices mentioned in the foregoing.

The above and other objects, features and advantages of the invention will become apparent from the following detailed description thereof taken in connection with the accompanying drawings.

BRIEF DESCRIPTION OF THE DRAWINGS

FIG. 2 is an illustration of the relation of APEX values of the exposure time to be used for the camera shown in FIG. 1 to the data set at a counter 5 and the data to be produced from an exposure time data producing circuit 8.

DETAILED DESCRIPTION OF PREFERRED EMBODIMENT

Figure 1:
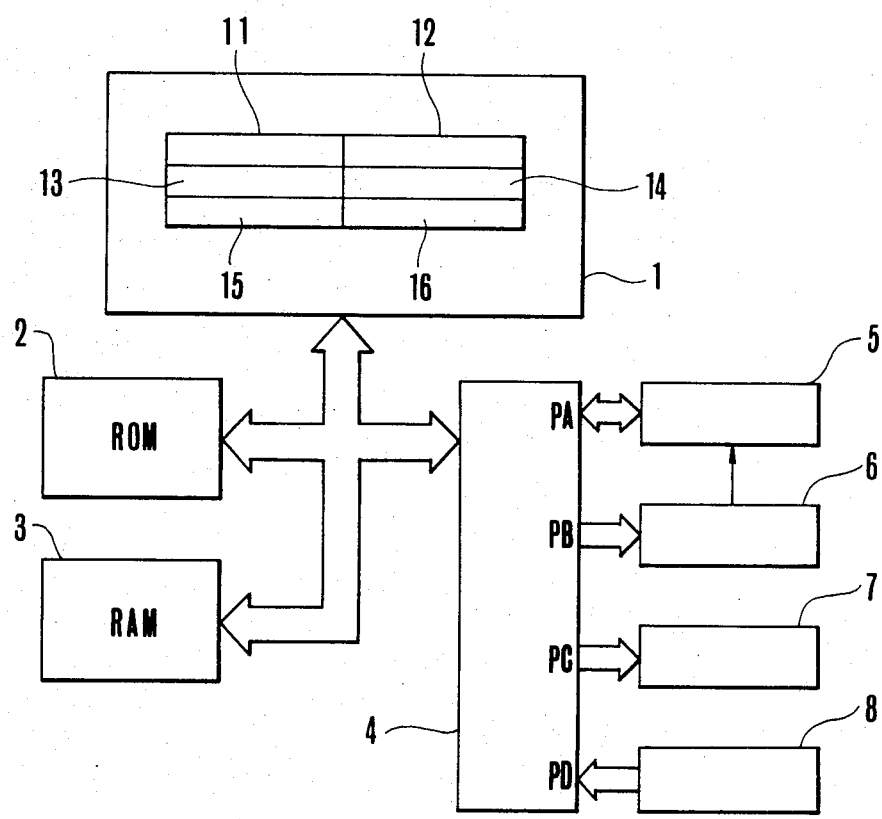
FIG. 1 is a block diagram showing the essential parts of a single-lens reflex camera using an exposure time reproducing device according to the invention.

FIG. 1 is a block diagram of an exposure time reproducing device using an 8-bit micro-computer (hereinafter called a μ-COM for short) and embodying the invention. A reference numeral 1 denotes a micro-processor unit (hereinafter called CPU for short). Provided within the CUP 1 are known circuits including a flug 11 which indicates a condition after computation, an 8-bit accumulator 12 (hereinafter called ACC for short); a B register 13; a C register 14; an H register 15; an L register 16; and so on. The B register 13 and C register 14 and the H register 15 and L register 16 can be used in pairs as 16 bit registers respectively by interconnecting them. Other circuits also included in the CPU 1 in addition to these circuits are irrelevant to the following description, and, therefore, are omitted therefrom. The embodiment further includes a ROM 2 which stores the instructions, etc. of the CPU 1; a RAM 3 which is arranged to perform a temporary storing action to store an exposure time correction datum which will be described hereinafter; an interface circuit 4 which controls outside circuits in accordance with instructions from the CPU 1 (hereinafter the interface circuit 4 will be called I/O for short); a 16 bit counter 5 which is controlled by the I/O 4 through a terminal PA of the latter and is arranged to count clock pulses coming from a clock selector circuit; and the clock selector circuit 6 which is controlled by the I/O 4 through its terminal PB. The clock selector circuit 6 impresses clock pulses of 32.768 KHz on the 16 bit counter 5 when a datum 0 is produced at the terminal PB and clock pulses of 1.024 KHz when a datum 1 is produced at the terminal PB. The embodiment further includes a shutter operation control circuit 7 which is controlled by the I/O 4 through its terminal PC and is arranged to cause a shutter (not shown) to open when a datum 02 is set at the terminal PC and to close when a datum 01 is set at the terminal PC; and an exposure time data producing circuit 8. The circuit 8 is arranged to produce a datum TV' of 8 bits which is converted as shown in FIG. 2 on the basis of exposure time either computed or set by a known method.

Figure 3:
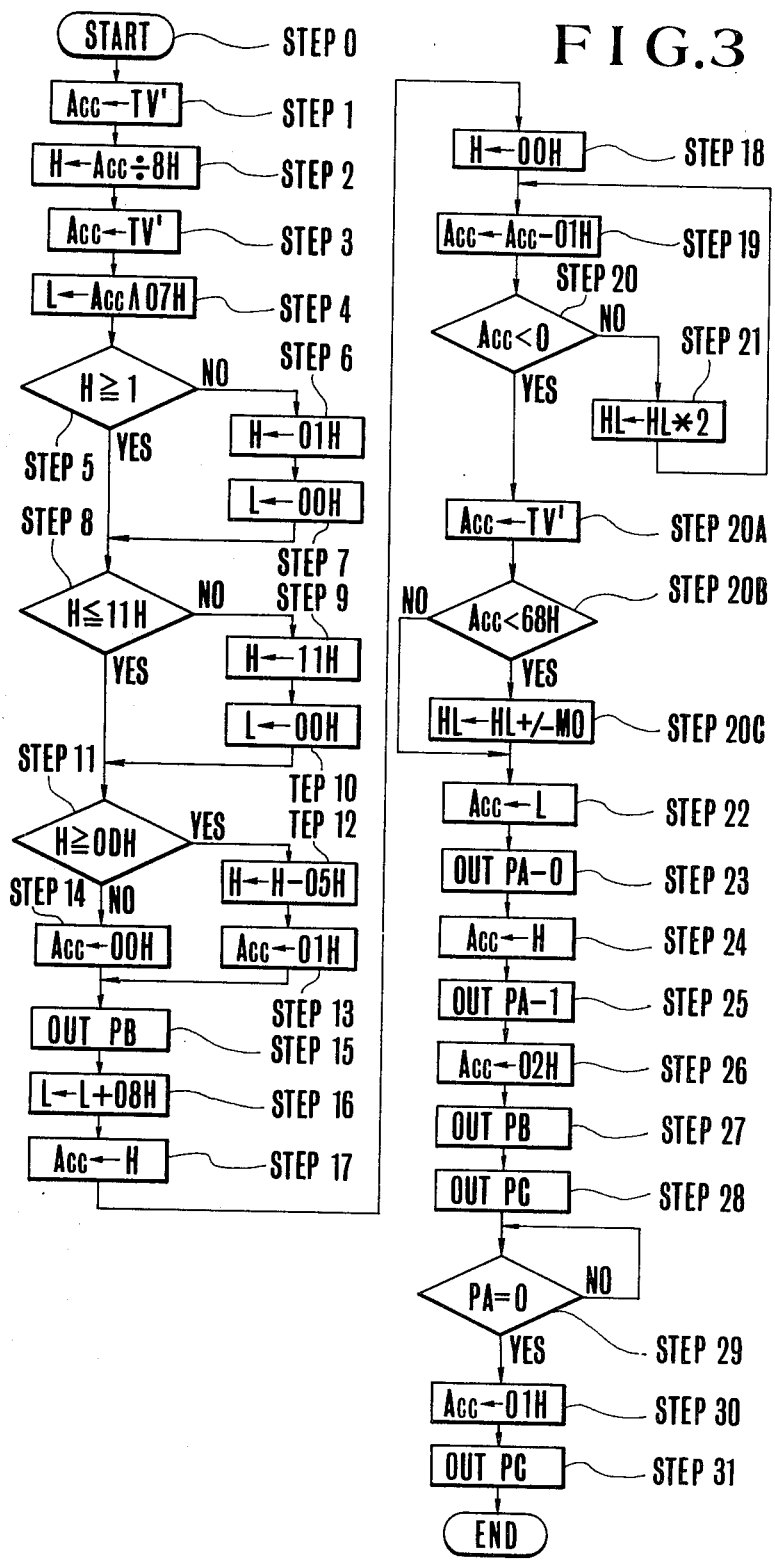
FIG. 3 is a chart showing the flow of the operation of the camera shown in FIG. 1.

In FIG. 3 which is a flow chart, various instructions are stored in the ROM 2 as shown. The CPU 1, the ROM 2, the RAM 3, the I/O 4 and the circuits 5–8 are interconnected with each other as shown by arrows to give and receive data in a known manner.

The relations of the APEX values of exposure time to the data TV', clock pulses, etc. is as outlined in FIG. 2.

In FIG. 2, a reference symbol TV denotes the APEX values of exposure time. In this particular embodiment, the exposure time is controlled by units of ⅛ EV. Accordingly, exposure time values TV are listed in FIG. 2 in ⅛ EV units. In the values TV, the APEX value of 110 represents an exposure time value of 1/2000 sec; the APEX value of 100 represents an exposure time value of 1/1000 sec; and the APEX value of −50 represents an exposure time value of 32 sec. In FIG. 2, another reference symbol TV' denotes the above stated data which are in relation of TV'=12−TV and, for the sake of convenience, the data are expressed in sexadecimal or hexadecimal digits. A reference symbol TSET denotes the number of pulses to be set at the counter 5. The number of pulses is also, for the sake of convenience, expressed in sexadecimal digits. Another reference symbol CLOCK denotes the frequency of read-out clock trains to be impressed on the counter 5 from the clock selector circuit 6. As shown, the read-out frequency of 32.768 KHz for APEX values from 110 to 00 and is 1.024 KHz for the APEX values from −10 to −50.

In FIG. 3, the device arranged as shown operates in the following manner: At step 0, an action for reproducing the exposure time begins (assuming completion in a known manner of other actions such as stopping down the aperture, lifting the mirror, etc. that are to be done in a single lens reflex camera before the exposure time reproducing action have been completed in a known manner). At step 1, the datum TV' (see FIG. 2) which has been produced at the exposure time data producing circuit 8 is taken into the ACC 12 through the I/O 4. At step 2, the datum TV' taken into the ACC 12 is divided by 8 of the sexadecimal digits and, after that, is stored at the H register 15. Accordingly, the H register 15 stores a datum relative to the integral part of the exposure time. For example, the H register 15 stores "1" when the exposure time to be reproduced is 1/2000 sec and "3" when the exposure time is 1/500 sec. Upon completion of this action, a datum TV' from the exposure time data producing circuit 8 is again taken into the ACC 12 through the I/O 4 at step 3. Following this, at step 4, a logical product of the datum TV' taken into the ACC 12 and a sexadecimal or hexadecimal digit "7" is obtained and the datum is stored at the L register 16. Accordingly, a datum relative to the decimal part of the exposure time is stored at the L register 16.

Next, steps 5 to 10 determine whether or not the datum TV' which has been thus taken in is within the control range of the camera in the following manner: At step 5, the content of the H register 15 which stores the datum relative to the integral part of the exposure time is judged as to whether it is larger or smaller than "1". If the content is smaller than "1", the datum TV' is shorter than the minimum control time of the camera. Therefore, at step 6, a hexadecimal digit "01" (hereinafter the hexadecimal digits are called HEX for short) is set in the H register 15 while, at step 7, "00" HEX is set in the L register 16. In other words, in such a case, data representing the minimum control time (which is 1/2000 sec in this embodiment) are respectively stored in the H and L registers 15 and 16. Then, at step 8, the datum taken in the H register 15 is judged as to whether it is larger or smaller than HEX "11" (or, in other words, as to whether it is larger than the maximum control time of the camera). If it is judged to be larger than "11", the H register 15 has HEX "11" set therein at the step 9. Meanwhile, at step 10, HEX "00" is set at the L register 16. In other words, in this case, data representing the maximum control time (or 30 sec in this embodiment) are respectively set in the H and L registers 15 and 16. At step 11, the datum stored at the H register 15 is again subjected to a discriminating action for the purpose of selecting a read-out frequency in the following manner:

At step 11, the datum of the H register 15 is judged as to whether it is larger than "0D" HEX (or, in other words, whether it is larger than an exposure time of 2 sec). If it is judged to be larger, a datum obtained by subtracting HEX "05" from the datum of the H register 15 is set again at the H register 15 at a step 12. Further, at a step 13, HEX "01" is set at the ACC 12. This causes HEX "01" set at the terminal PB of the I/O 4 at a step 15. Then, the clock selector circuit 6 supplies a read-out frequency of 1.024 KHz to the counter 5.

In case the datum of the H register 15 is judged to be smaller than "0D" at the step 11, HEX "00" is set at the ACC 12 at step 14. As a result of that, at step 15, the terminal PB of the I/O 4 is set to HEX "00". Then, the clock selector circuit 6 supplies a read-out frequency of 32.768 KHz to the counter 5. At steps 16 to 21, after completion of the above stated action, the number of count pulses to be set at the counter 5 is computed on the basis of the contents of the H and L registers 15 and 16. The computation is performed in the following manner: At step 16, HEX "08" is added to the content of the L register 16 which stores the datum relative to the decimal part of the exposure time datum TV' taken in. Then, correction required for the control of ⅛ EV is carried out. At step 17, after the correction, the content of the H register 15 is set at ACC 12. At step 18, HEX "00" is then set at the H register 15 and the register 15 becomes empty. Through these steps, a combination of the H register 15 and the L register 16 become ready for use with 16 bits. Then, an operation of expanding the datum TV' by shifting the content of the decimal part of the exposure time according to the content of the integral part thereof is carried out in the following manner:

At step 19, HEX "01" is subtracted from the content of the ACC 12. At step 20, a discriminating action determining whether the content of the ACC 12 is larger than "0" of HEX or not is carried out. If the content of the ACC 12 is larger than the HEX "0", the content of the H register 15 and the L register 16 which jointly form a 16 bit register (hereinafter will be called the HL register) is squared. In case the content of the ACC 12 is smaller than the HEX "0", that is, if it is of a negative value, the content of the HL register is not squared. In other words, it is not shifted and is stored as TSET. The further details of the processes of steps 16-20 are as follows: In case the APEX value is "11" (see FIG. 2), the content of the L register 16 becomes "00001000" when "08" of HEX is added at step 16. Then, at step 19, when HEX "01" is subtracted from the content of the ACC 12, the contents of the ACC 12 becomes "0". Therefore, the content of the HL register is shifted once to the left at a step 21 and becomes "10" of HEX. Upon completion of the shift at the step 21, the operation goes back to step 19 and again HEX "01" is subtracted from the content of the ACC 12. However, since the content of the ACC 12 at that time has been changed to "0" by the previous subtraction, the second subtraction causes the content of the ACC 12 to become "−1". Accordingly, when the content of the ACC 12 is compared with "0" at step 20, the operation does not go to the step 21 but goes to a next step 20A. Further, the BC registers store "10" of HEX (see FIG. 2).

If the APEX value is $10\frac{1}{8}$ (see FIG. 2), for example, the content of the C register 14 becomes 00001001 when "08" of HEX is added. Then, at steps 19-21, the content of the L register 16 is shifted to the left once and is stored as "12" of HEX at the HL register. After that, the operation proceeds to steps 20A-20C, where the number of pulses TSET obtained at the BC registers through the above stated process is corrected to prevent control errors. These errors, during a high speed exposure, tend to result from overlapping of shutter curtains and the response delay of a shutter control magnet which is not shown. More specifically stated, at the step 20A, the datum TV' (see FIG. 2) from the data producing circuit 8 is taken into the ACC 12. At step 20B, the datum thus obtained is compared with HEX "68" to determine whether it is larger than HEX "68". In other words, the exposure time thus obtained is examined to see if it is a high speed time requiring correction. If the exposure time datum thus obtained is found smaller than HEX "68", i.e. if the datum thus obtained is judged to be smaller than the datum TV' of the exposure time 2 sec, an exposure time correction datum MO stored in the RAM 3 is either added to or subtracted from the content of the HL register at step 20C. On the other hand, if the datum obtained is larger than HEX "68", the process jumps to a step 22 to have the following action performed: At step 22, the content of the L register 16 is taken into the ACC 12. At step 23, the datum of the ACC 12 is set at the terminal PA0 of the I/O 4. The content of the L register 16 is set at the lower 8 bits of the counter 5 through the terminal PA0 of the I/O 4.

Following this, at step 24, the content of the H register 15 is taken into the ACC 12. At step 25, the datum of the ACC 12 is set at the terminal PA1 of the I/O 4. The content of the H register 15 is set at the higher 8 bits of the counter 5 through the terminal PA1 of the I/O 4.

Through these processes, therefore, the content TSET (see FIG. 2) of the HL register which is to be counted at the time of closing a shutter (not shown) is transferred to the 16 bit counter 5 to be stored there. At step 26 in the next place, a datum ("02" of HEX) which is for activating the clock selector 6 is taken into the ACC 12. Then, at a step 27, this datum HEX ("02") is set at the terminal PB of the I/O 4. The clock selector 6, therefore, supplies the counter 5 with a pulse train of a read-out frequency corresponding to the datum TV' obtained, that is, a pulse train of 32.768 KHz is supplied if the datum obtained corresponds to HEX "08" ("11" of TV), for example. Further, in case this datum TV' corresponds to HEX "88" ("−5" of TV), the counter 5 is supplied with a pulse train of 1.024 KHz. The pulse train thus supplied causes the counter 5 to begin to count down the datum TSET, which has been already set there, at a speed corresponding to the frequency of the pulse train thus supplied. Further, at a step 28, the terminal PC of the I/O 4 is set at "02" of HEX which is the above stated datum. Then, this causes a magnet which is not shown but is arranged to lock a leading shutter curtain (not shown) to be controlled by an output signal of a magnet control circuit 7. Accordingly, the shutter which is not shown is opened at the safe time as down-counting of the counter 5 commences.

When the counter 5 begins to count down as mentioned above, a checking process is effected at step 29 to find if the result of subtraction at the counter 5 has reached "0". When the result of subtraction reaches "0", the operation proceeds to the step of closing the shutter. In other words, when the result of the above stated check indicates that the content of the counter 5 has become "0", the ACC 12 is set at HEX "01" at step 30. Further, at step 31, the terminal PC of the I/O 4 is also set at HEX "01". Then, a magnet (not shown) which locks a trailing shutter curtain (not shown) is controlled by an output signal of the magnet control circuit 7. This causes the shutter to close to end an exposure.

In the embodiment described, the use of the clock pulses counted by the counter 5 may be replaced with the use of instructions from the CPU. Further, the counting action of the counter 5 is not limited to the counting down action. Further, in accordance with the invention, the number of bits of the CPU and the counter 5 are not limited to 8 bits and 16 bits, but may be replaced with any other desired number of bits. It is an additional advantage of this embodiment that fine adjustment of exposure control time can be accomplished by just adjusting the exposure time correction data MO which are stored in the RAM 3, so that unevenness in the shutter mechanism can be simply and easily corrected.

Figure 4:
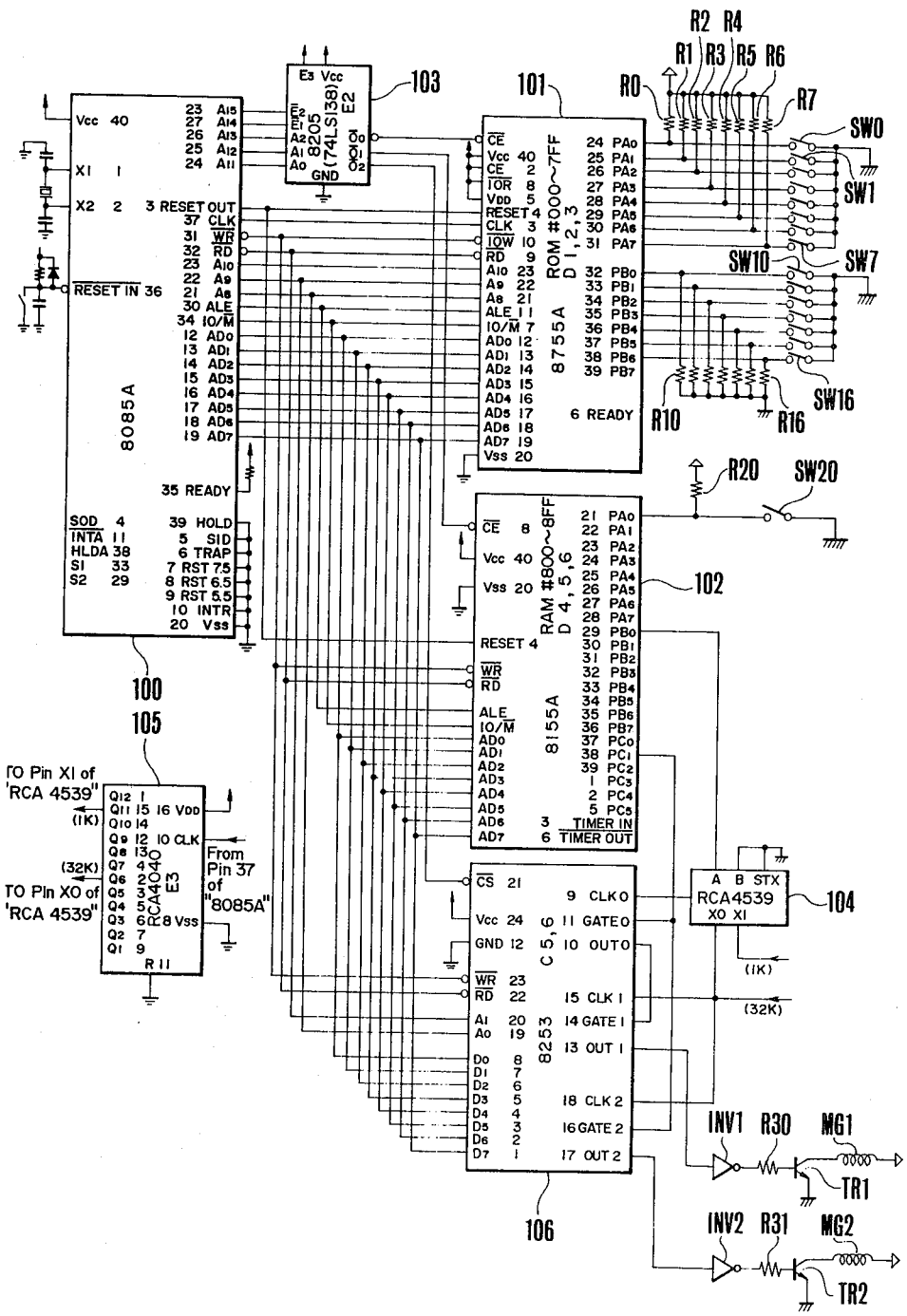
FIG. 4 is a circuit connection diagram showing a specific circuit arrangement of the embodiment of the invention shown in FIG. 1.

FIG. 4 shows a specific circuit arrangement of the camera shown in FIG. 1. Referring to FIG. 4, a reference numeral 100 denotes a micro-computer which corresponds to the $\mu$-COM 1 shown in FIG. 1. The micro-computer 100 used in this specific embodiment is Model 8085A of the INTEL Corporation (hereinafter called INTEL for short). A ROM 101 which corresponds to the ROM 2 shown in FIG. 1 is a program ROM which stores read-out program instructions and permits addressing for control of a sequence of the processes particularly the shutter actions of a camera. The ROM 101 is provided with 8 bit input ports PA0--PA7 which have the exposure time data producing circuit 8 connected thereto. The exposure time data producing circuit 8 has one terminal thereof connected to a power source. Other terminals of the exposure time data producing circuit 8 are respectively formed by resistors R0-R7 which are connected to pins corresponding to the input ports PA0-PA7 and data setting switches SW0-SW7 (reference symbols SW2-SW6 are omitted in the drawing) which are connected to the pins corresponding to the input ports PA0-PA7. The data TV' which are shown in FIG. 2 are arranged to be supplied to the input ports PA0-PA7 of the ROM 101 with the switches SW0-SW7 suitably closed and opened.

The ROM 101 is also provided with input ports PB0-PB6 which are connected to a 7 bit exposure time correction data producing circuit which produces the above stated exposure time correction data MO. This exposure time correction data producing circuit is arranged in a manner similar to the above stated exposure time data producing circuit and includes resistors R10-R16 which are connected to the input ports PB0-PB6 (reference symbols R11-R15 for the resistors connected to the input ports PB1-PB5 are omitted from the drawing); and switches SW10-SW16 (reference symbols SW11-SW15 are omitted from the drawing) which are connected as shown in FIG. 4. The exposure time correction data MO mentioned in the foregoing are arranged to be applied to the input ports PB0-PB6 of the ROM 101 with these switches SW10-SW16 suitably operated. In this specific embodiment, the INTEL Model 8755A is employed as the ROM 101. A RAM 102 which corresponds to the RAM 3 of FIG. 1 is an INTEL Model 8155A in this embodiment. Pins of the RAM 102 are connected to other elements in a manner as shown in FIG. 4. The data MO from the exposure time correction data producing circuit are applied to and stored at the RAM 102 through the ROM 101. Further, the I/O 4 shown in FIG. 1 is formed jointly by the RAM 102 and the ROM 101. A decoder 103 is connected to the pins of the μ-COM 100 and to other elements in a manner as shown in FIG. 4. In this embodiment, an INTEL Model 8205 is used as the decoder 103. A clock selector circuit 104 which corresponds to the clock selector circuit 6 of FIG. 1 is Model 4539 of the RCA Corporation (hereinafter called RCA for short) in this embodiment. The pins of this circuit 104 are connected as shown in FIG. 4. A frequency divider 105 which is connected as shown to other elements is Model 4040 of RCA in this case.

A switch SW20 and a resistor R20 form a shutter release signal producing circuit which produces a shutter release signal. At the start of a sequence of shutter release processes, the switch SW20 closes to have the shutter release signal applied to the input port PA0 of the RAM 102. A timer 106 serves as the counter 5 and the shutter operation control circuit 7 which are shown in FIG. 1. The timer 106 incorporates therein first, second and third timers TM0, TM1 and TM2 which are not shown. The output terminal of the first timer TM0 is connected to a pin OUT0. The output terminals of the second and third timers TM1 and TM2 are connected respectively to pins OUT1 and OUT2. The pin OUT1 of the timer 106 is connected through an inverter INV1, a resistor R30 and a transistor TR1 to a magnet MG1 which controls the travel of a trailing shutter curtain (not shown). Meanwhile, the pin OUT2 of the timer 106 is connected to another magnet MG2 through an inverter INV2, a resistor R31 and a transistor TR2. A pin Vcc which is provided for the elements 100, 101, 102 and 103 and a pin VDD which is provided for the element 105 are connected to a power supply circuit to receive a driving voltage therefrom.

The operation of a single-lens reflex camera having a slit shutter which is arranged as described above is substantially the same as the embodiment shown in FIG. 1. Therefore, the following description covers only the important parts of the operation of the single-lens reflex camera:

The sequence of the shutter release processes begins with the switch SW20 closed and with the input port PA0 of the RAM 102 coming to assume a state of "0". At this time, an exposure time datum is computed in accordance with the processes shown in the flow chart of FIG. 3. Assuming that the exposure time is one second and the exposure time correction datum MO is "0", the timer TM0 is set at 8000 HEX (see FIG. 2). Meanwhile, data of 0100 HEX which are about 8 msec are set at the timer TM2 which is provided for a leading shutter curtain (not shown) and at the timer TM1 for the trailing shutter curtain. For this exposure time, clock pulses of 32.768 KHz are used. The output port PB0 of the RAM 102 which forms the I/O becomes "0". This causes the input A to the clock selector circuit 104 to become "0". Then, clock pulses of 32.768 KHz are applied to the timer TM0 which is located within the timer 106.

Following this, when the output port PC1 of the RAM 102 comes to assume the state of "1", the timer TM2 and TM0 simultaneously begin to operate to produce "0" to the pins OUT2 and OUT0 for preset periods of time, which are 8 msec for the timer TM2 and 1 sec for the timer TM0. As a result of that, a power supply is effected for the period of 8 msec to the magnet MG2 and the shutter which is not shown is opened by this power supply.

After the lapse of the set period of one second, the output of the timer TM0 becomes "1". A pin GATE 1 which is arranged to serve as gate for the timer TM1 then assumes a state of "1". This causes the timer TM1 to begin to operate to produce a "0" output to the pin OUT1 of the timer 106 for the preset period of time, which is 8 msec in this case. As a result of that, a power supply is effected to the magnet MG1 for the period of 8 msec to cause the trailing shutter curtain which is not shown to travel. With the trailing curtain thus caused to travel, an exposure operation on a film which is not shown comes to an end.

In accordance with the invention as described in the foregoing, the shifting of read-out pulses is required only once with the 16 bit counter used even for the exposure time control over such a wide range of shutter speeds as from 1/2000 sec to 32 sec. The invention thus simplifies the circuit arrangement for producing the read-out pulse trains. Accordingly, in accordance with the invention, a high-grade camera of a wide control range can be obtained at a low cost.

Where the exposure time datum TV' which is fetched corresponds to a high speed time, an exposure time correction datum MO is either added or subtracted, so that an exposure error due to overlapping arrangement of the shutter curtains and the response delay of a magnet can be effectively prevented in accordance with the invention.

What we claim is:

1. An exposure time generating apparatus for a camera having leading and trailing shutter curtains, comprising:
   (a) data shift means for expanding a digital datum representing a logarithmically suppressed exposure time value by shifting the fractional part of the digital datum according to the content of the integral part thereof;
   (b) digital data adjusting means for adjusting the shifted digital datum in accordance with an exposure time correction datum;
   (c) read-out means for reading out the adjusted digital datum with pulses of predetermined, frequency; and
   (d) control means for producing a signal for controlling the trailing shutter curtain when the digital datum read out by the read-out means reaches a predetermined value.

2. An exposure time generating apparatus according to claim 1, wherein said exposure correction datum is related to overlapping arrangement of the shutter curtains and the response delay time of a magnet provided for operating the trailing shutter curtain.

3. A camera having leading and trailing shutter curtains, comprising:
   (a) data shift means for expanding a digital datum representing a logarithmically suppressed exposure time value by shifting the fractional part of the digital datum according to the content of the integral part thereof;
   (b) digital data adjusting means for adjusting the shifted digital datum in accordance with an exposure time correction datum;

(c) read-out means for reading out the adjusted digital datum with pulses of predetermined frequency;

(d) control means for producing a signal to control the trailing shutter curtain when the digital datum read out by the read-out means reaches a predetermined value; and (e) shutter control means responsive to the signal from said control means for controlling the trailing shutter curtain.

* * * * *